(12) United States Patent
Ghelberg et al.

(10) Patent No.: US 10,825,234 B2
(45) Date of Patent: Nov. 3, 2020

(54) PREVIEWING 3D CONTENT USING INCOMPLETE ORIGINAL MODEL DATA

(71) Applicant: Resonai Inc., Tel Aviv (IL)

(72) Inventors: Shai Daniel Ghelberg, Tel Aviv (IL); Oren Meir, Giv'at Brener (IL); Oren Weitzman, Matan (IL); Emil Ismalon, Pardes Hana (IL)

(73) Assignee: RESONAI INC., Tel Aviv (IL)

( * ) Notice: Subject to any disclaimer, the term of this patent is extended or adjusted under 35 U.S.C. 154(b) by 21 days.

(21) Appl. No.: 16/156,063

(22) Filed: Oct. 10, 2018

(65) Prior Publication Data

US 2019/0108672 A1 Apr. 11, 2019

Related U.S. Application Data

(60) Provisional application No. 62/570,158, filed on Oct. 10, 2017.

(51) Int. Cl.
| | |
|---|---|
| *G06T 15/00* | (2011.01) |
| *G06T 15/10* | (2011.01) |
| *G06T 15/50* | (2011.01) |
| *G06F 21/31* | (2013.01) |
| *G06T 17/20* | (2006.01) |
| *G06T 19/00* | (2011.01) |
| *G06F 21/62* | (2013.01) |
| *G06T 15/20* | (2011.01) |

(52) U.S. Cl.
CPC ............. *G06T 15/10* (2013.01); *G06F 21/31* (2013.01); *G06F 21/6209* (2013.01); *G06T 15/205* (2013.01); *G06T 15/506* (2013.01); *G06T 17/20* (2013.01); *G06T 19/006* (2013.01); *G06T 2200/16* (2013.01)

(58) Field of Classification Search
None
See application file for complete search history.

(56) References Cited

U.S. PATENT DOCUMENTS

2017/0038828 A1* 2/2017 Cho .................. G06F 3/011

* cited by examiner

*Primary Examiner* — Martin Mushambo
(74) *Attorney, Agent, or Firm* — Finnegan, Henderson, Farabow, Garrett & Dunner LLP

(57) ABSTRACT

A preview system previews 3D content without providing complete 3D model content data. The preview system includes at least one processor that receives a request for a 3D model for preview. The processor generates at least one representation of the 3D model based on a portion of the 3D model content data associated with the requested 3D model. The processor generates a preview scene by combining the at least one representation of the 3D model with a scene from a user image environment. The preview scene included incomplete 3D model content data. The processor outputs the preview scene for display in the user image environment.

20 Claims, 7 Drawing Sheets

PREVIEWING 3D CONTENT USING INCOMPLETE ORIGINAL MODEL DATA

CROSS-REFERENCE TO RELATED APPLICATION

This application is based on and claims benefit of priority of U.S. Provisional Patent Application No. 62/570,158, filed Oct. 10, 2017, which is incorporated herein by reference in its entirety.

BACKGROUND

There has been a significant increase in the amount of 3D audiovisual content creation and distribution in recent years. 3D audiovisual content typically includes one or more 3D models of a variety of objects. Each of the 3D models may be represented by a mesh, a point cloud, or any other type of 3D representation. 3D models may also include other information such positional information, curvature information, texture information, color information, animation information, shading information, lighting information, etc. Typically, 3D model providers offer their 3D models via various platforms to users such as, for example, game developers, interior designers, industrial designers, creators of virtual reality scenes, and/or augmented or mixed reality application developers, etc.

To facilitate efficient and easy development of audiovisual content, such users may wish to use pre-existing 3D models to generate their audiovisual content instead of developing their own 3D models, which may require additional significant time and effort. Moreover, using pre-existing 3D models may help eliminate duplication of effort, resulting from different users and/or 3D model providers creating 3D models of the same object. The pre-existing 3D models may be offered for sale by the 3D model providers to the users. Before incorporating a pre-existing 3D model into their 3D content, however, users may wish to preview the pre-existing 3D model. In particular, users may want to preview how the pre-existing 3D model will appear once incorporated into their respective 3D environments, prior to downloading/purchasing the 3D model.

For example, a user (e.g., a game developer) may wish to create a game scene using a pre-existing 3D model. Before purchasing the pre-existing 3D model, however, the game developer may wish to preview the 3D model in his or her game environment along with other 3D models that may already exist in that game environment. Current solutions, however, only allow the game developer to incorporate the 3D model into his or her game environment after first purchasing the pre-existing 3D model from a provider of the 3D model. As a result, the game developer may end up purchasing 3D models that may later turn out to be unsuitable for use in the game environment, making game development expensive and time-consuming. Therefore, there is a need to allow the game developer (or other user) to preview pre-existing 3D models within the user's development environment before purchasing the pre-existing 3D model.

This need, however, conflicts with that of the 3D model provider desirous of protecting his or her rights in the 3D content. For example, if the 3D model provider were to provide the complete 3D model to the game developer for previewing, before the game developer has purchased the 3D model, the game developer would be able to use the 3D model in his game environment without purchasing the 3D model or obtaining content use rights for the 3D model. One traditional way of protecting the 3D content provider includes rendering the 3D game content for previewing using a server that does not belong to the game developer or to the 3D model provider. The server delivers the final rendered game content to the game developer for preview. Doing so ensures that the complete 3D model content data is not disclosed to the game developer.

However, this approach has several drawbacks. For example, rendering the content on an outside server may take more time. In particular, the outside server may need to process the scene every time the scene detail or camera viewing angle changes. This, in turn, may delay generation of the rendered game content for the game developer to preview. Moreover, to render the content on an outside server, the game developer may have to send an entire scene to the server, thus making the content created by the game developer available to the public. Thus, conventional technologies do not allow a content creator to preview pre-existing 3D models while simultaneously protecting the rights of both the content creator and the 3D model provider.

The content previewing system of the present disclosure solves one or more of the problems discussed above and/or other problems of the prior art.

SUMMARY

In one aspect, the present disclosure is direct to a computer-implemented preview system for previewing 3D content without providing complete 3D model content data. The preview system may include at least one processor. The processor may be configured to receive a request for a 3D model for preview. The processor may also be configured to generate at least one representation of the 3D model based on a portion of the 3D model content data associated with the requested 3D model. Further, the processor may be configured to generate a preview scene by combining the at least one representation with a scene from a user image environment. In addition, the processor may be configured to output the preview scene for display in the user image environment. The preview scene may include incomplete 3D model content data.

In another aspect, the present disclosure is directed to a computer-implemented method of previewing 3D content without providing complete 3D model content data. The method may include receiving a request for previewing a 3D model. The method may also include generating, using at least one processor, at least one representation of the requested 3D model based on a portion of the 3D model content data associated with the requested 3D model. Further the method may include generating, using the at least one processor, a preview scene by combining the at least one representation with a scene from a user image environment. The method may include outputting the preview scene for display in the user image environment, the preview scene containing incomplete 3D model content data. The method may also include receiving a request for complete 3D model content data corresponding to the requested 3D model. The method may include determining whether the user is authorized to receive the complete 3D model content data. Additionally, the method may include providing the complete 3D model content data associated with the requested 3D model when the user is authorized to receive the model data.

In yet another aspect, the present disclosure is directed to a non-transitory computer readable medium storing instructions for previewing 3D content without providing complete 3D model content data. The instructions may be executed by a processor to perform certain steps. The steps may include receiving a request for preview of a 3D model. The steps may also include generating at least one representation of the requested 3D model based on a portion of the 3D model content data associated with the requested 3D model. Further, the steps may include generating a preview scene by combining the at least one representation with a scene from a user image environment. The steps may include outputting, using the processor, the preview scene for display in the user image environment, the preview scene containing incomplete 3D model content data. The steps may further include receiving a request for complete 3D model content data corresponding to the requested 3D model. The steps may include determining whether the user is authorized to receive the complete 3D model content data. Additionally, the steps may include providing the complete 3D model content data associated with the requested 3D model when the user is authorized to receive the model data.

Additional objects and advantages of the embodiments of the present disclosure will be set forth in part in the description which follows, and in part will be understood from the description, or may be learned by practice of the embodiments of the present disclosure. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this disclosure, illustrate exemplary disclosed embodiments of the present disclosure and, together with the description, serve to explain the principles of the present disclosure. In the drawings.

DETAILED DESCRIPTION

Aspects of the present disclosure relate to a computer implemented preview system for previewing 3D content without providing complete 3D model content data. 3D content refers generally to a 3D model of one or more objects that may be used to create a 2D or 3D scene in, for example, a game development environment, a virtual reality environment, an augmented reality environment, and/or a mixed reality environment. For example, the scene may be a 2D or 3D representation of a room, containing various objects, such as, a chair, a table, a lamp, a door, etc. Each of these various objects may in turn be represented by 3D models corresponding to those objects.

A 3D model may include 3D model content data, which may include information, such as, a complete geometric description of the object. Such a geometric description may include, for example, geometric locations (x, y, z) of nodes of a mesh, or geometric locations (x, y, z) of points in a point cloud representing the object. 3D model content data may also include, for example, information regarding a normal vector associated with one or more points in the point cloud. The 3D model may also include a plurality of 3D-voxel. The normal vector may represent a surface curvature of the object associated with the points in the point cloud. Further, 3D model content data may also include texture information for various surfaces of the object, and colors of various surfaces of the object, including, for example, RGB color information for the points in the point cloud. Additionally, 3D model content data may include information about the material used to make that object. 3D model content data may also include animation information regarding, for example, relative movement of different parts of the object. For example, the 3D model content data included in a 3D model of a swiveling chair may include information regarding a relative movement between a rotating seat of the chair relative to a base of the chair, and/or a relative movement of the chair on a ground surface. 3D model content data may also include lighting model information for displaying color variations and gradations on the object surfaces based on locations and/or properties of one or more light sources in the scene.

While the present disclosure provides exemplary information included in 3D model content data, it should be noted that aspects of the disclosure in their broadest sense are not limited to the disclosed information. Rather, it is contemplated that the foregoing principles may be applied to other types of information that may be included in the 3D model content data associated with the 3D model of an object.

Figure 1:
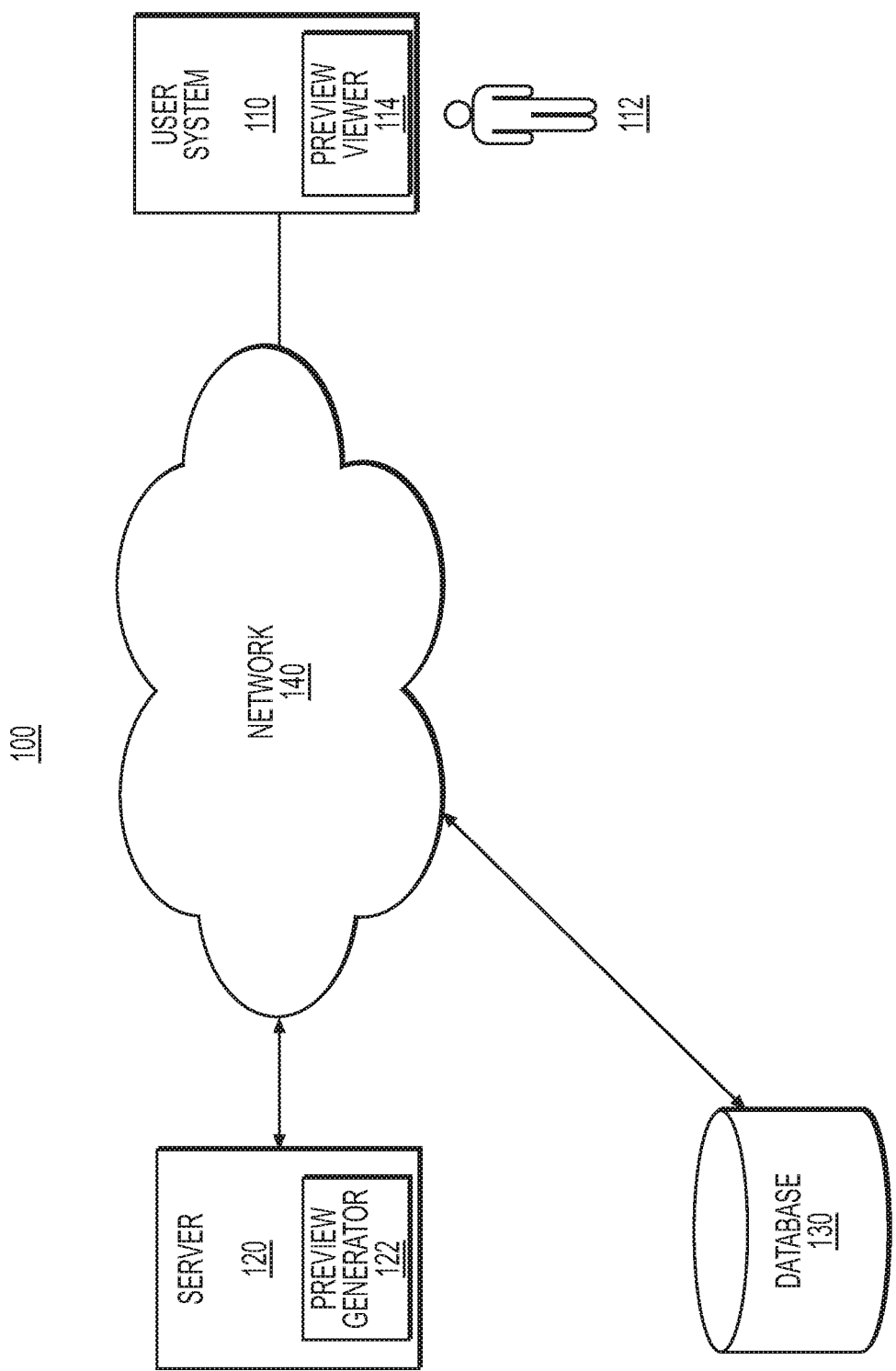
FIG. 1 illustrates an exemplary previewing system for previewing 3D content without providing complete 3D model content data consistent with disclosed embodiments.

In accordance with the present disclosure, the computer implemented preview system may include several components that may interact and cooperate with each other to allow previewing of 3D content from a content provider without the need for providing complete 3D model content data. By way of example, FIG. 1 illustrates an exemplary preview system 100 consistent with the present disclosure. As illustrated in FIG. 1, preview system 100 may include, for example, user system 110, user 112, server 120, database 130, and network 140.

User system 110 may include one or more computational devices that may be used by a user (e.g., a content creator) for creating audiovisual content. By way of example, user system 110 may include computational devices such as personal computers, laptop computers, desktop computers, tablet computers, notebooks, etc. User system 110 may be configured to execute an application or a set of instructions to generate audiovisual content, for example, one or more scenes in a video game. User system 110 may be configured to be operated by one or more users 112. User 112 may be, for example, a video game developer, an interior designer, an industrial designer, a virtual reality content developer, an augmented reality content developer, or a mixed reality content developer. It is contemplated that user 112 may generate 2D or 3D audiovisual content.

Server 120 may include one or more computational devices that may be used by a content provider for generating and or providing 3D models of objects, which may be used by the one or more users 112 for creation of 2D or 3D audiovisual content in their respective user environments. By way of example, server 120 may be a general-purpose computer, a mainframe computer, or any combination of these components. In certain embodiments, server 120 may be standalone, or it may be part of a subsystem, which may be part of a larger system. For example, server 120 may represent distributed servers that are remotely located and communicate over a network (e.g., network 140) or over a dedicated network, such as a local area network (LAN). In addition, consistent with the disclosed embodiments, server 120 may be implemented as a server, a server system comprising a plurality of servers, or a server farm comprising a load balancing system and a plurality of servers.

Server 120 may be configured to execute an application or a set of instructions for generating or providing 3D models for a variety of objects. Server 120 may also be configured to interact with database 130 to store and/or retrieve 3D model content data in/from database 130. Server 120 may communicate with database 130 directly or via network 140. It is contemplated that, in some aspects, server 120 may be owned or operated by a 3D model provider, who may generate, collect, or store one or more 3D models of one or more objects that may be usable in the development of 2D or 3D audiovisual content by one or more users 112.

Database 130 may include one or more logically and/or physically separate databases configured to store instructions and/or 3D model content data. Data stored in database 130 may include various forms such as, but not limited to, image files, video files, audio files, documents and a variety of other data, including 3D model content data discussed above. Database 130 may be maintained and queried using numerous types of database software and program languages, such as SQL, MySQL, IBM DB2®, Microsoft Access®, PERL, C/C++, Java®, etc.

Network 140 may facilitate electronic communication and exchange of data and/or information between user system 110, server 120, and/or database 130. Network 140 may include any combination of communication networks. For example, network 140 may include the Internet and/or another type of wide area network, an intranet, a metropolitan area network, a local area network, a wireless network, a cellular communications network, etc. Although only one user system 110, one server 120, and one database 130 are illustrated in FIG. 1, it is contemplated that content preview system 100 may include any number of user systems 110, servers 120, and/or databases 130.

It is contemplated that user system 110 may include preview viewer 114 and server 120 may include preview generator 122. As will be described in detail below, preview generator 122 may be configured to generate one or more representations of a 3D model such that the representations include incomplete 3D model content data. Additionally, as will be described in detail below, preview viewer 114 may be configured to generate a preview scene by combining the one or more representations generated by preview generator 122 with a scene provided by user system 110.

Preview viewer 114 and preview generator 122 may be implemented using hardware components and/or using software instructions. It is also contemplated that preview viewer 114 and preview generator 122 may be implemented on application specific integrated circuits (ASICs) programmed to execute instructions to perform the functions of the disclosed preview viewer 114 and/or preview generator 122. Although FIG. 1 illustrates preview viewer 114 as being associated with user system 110, it is contemplated that preview viewer 114 may be implemented on server 120. Similarly although FIG. 1 illustrates preview generator 122 as being associated with server 120, it is contemplated that preview generator 122 may be implemented on user system 110. In addition, it is contemplated that in some exemplary embodiments, preview generator 122 and preview viewer 114 may both be implemented on user system 110 or on server 120. When both preview generator 122 and preview viewer 114 are implemented on the same computational device, encryption and decryption algorithms may be employed to ensure that the information generated by the preview viewer and the information stored in database 130 may be accessible only to authorized users 112.

Figure 2:
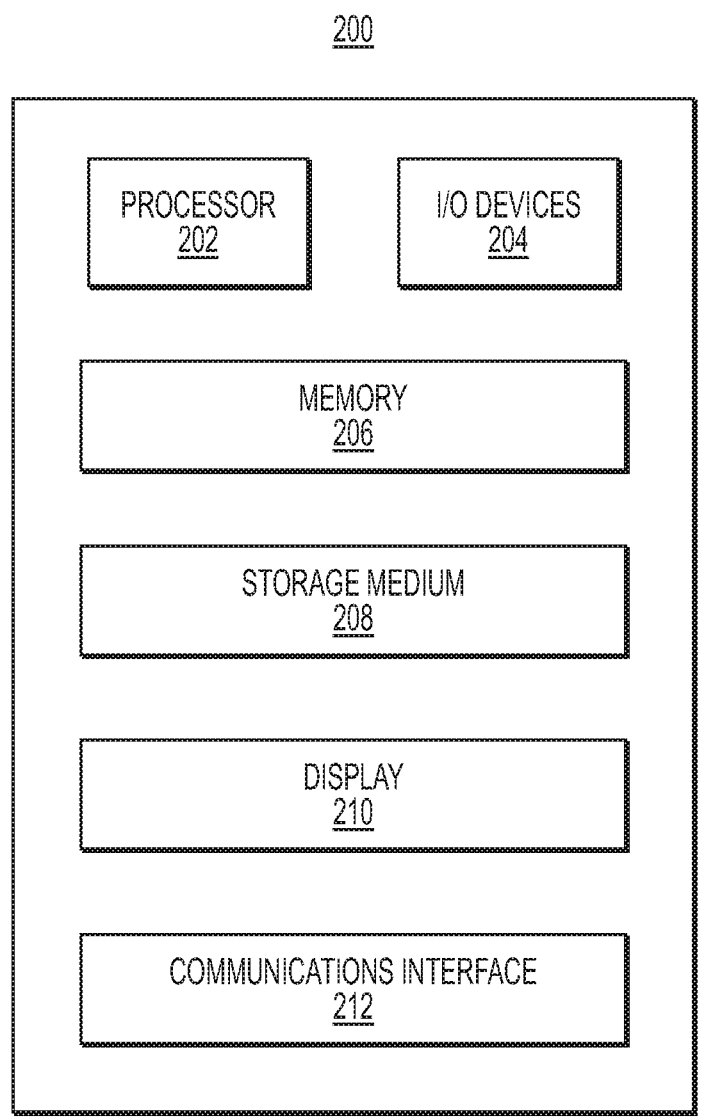
FIG. 2 illustrates an exemplary computational device for implementing embodiments of the previewing system of FIG. 1, consistent with disclosed embodiments.

FIG. 2 illustrates an exemplary computational device 200 for implementing embodiments and features of present disclosure. By way of example computational device 200 or a similar computational device may be used to implement user system 110 and/or server 120. The number of components in computational device 200 are provided for purposes of illustration. It is contemplated that additional arrangements, number of components, and/or other modifications may be made to the disclosed computational device 200, consistent with the present disclosure.

Computational device 200 may include one or more processors 202 for executing instructions. Processor 202 may be based on the Reduced Instruction Set Computer (RISC) architecture, Complex Instruction Set Computer (CISC) architecture, or any other computer instruction architecture known in the art. It is also contemplated that processor 202 may include one or more graphics or other digital signal processors. Processor 202 may be a single-core processor. In certain embodiments, processor 202 may use logical processors to simultaneously execute and control multiple processes. Processor 202 may implement virtual machine technologies, or other known technologies to provide the ability to execute, control, run, manipulate, store, etc. multiple software processes, applications, programs, etc. In other embodiments, processor 202 may include multiple-core processor arrangements (e.g., dual, quad core, etc.) configured to provide parallel processing functionalities to allow computational device 200 to execute multiple processes simultaneously. It is contemplated that other types of processor arrangements could be implemented that provide for the capabilities disclosed herein. The disclosed embodiments are not limited to any type of processor(s) configured in computational device 200.

Computational device 200 may also one or more input/output (I/O) devices 204. By way of example, I/O devices 204 may include physical keyboards, virtual touch-screen keyboards, mice, joysticks, styluses, etc. In certain exemplary embodiments, I/O devices 204 may include a microphone (not shown) for providing input to computational device 200 using, for example, voice recognition, speech-to-text, and/or voice command applications or algorithms.

As further illustrated in FIG. 2, computational device 200 may include memory 206 configured to store data or one or more instructions and/or software programs that perform functions or operations when executed by the one or more processors 202. By way of example, memory 206 may include Random Access Memory (RAM) devices, NOR or NAND flash memory devices, Read Only Memory (ROM) devices, etc. Computational device 200 may also include storage medium 208 configured to store data or one or more instructions and/or software programs that perform functions or operations when executed by the one or more processors 202. In some exemplary embodiments, storage medium 208 may also be configured to store data or instructions. By way of example, storage medium 208 may include hard drives, solid state drives, tape drives, RAID arrays, compact discs (CDs), digital video discs (DVDs), Blu-ray discs (BD), etc. Although FIG. 2 shows only one memory 206 and one storage medium 208, computational device 200 may include any number of memories 206 and storage mediums 208. Further, although FIG. 2 shows memory 206 and storage medium 208 as part of computational device 200, memory 206 and/or storage medium 208 may be located remotely and computational device 200 may be able to access memory 206 and/or storage medium 208 via network 140.

Computational device 200 may include one or more displays 210 for displaying data and information. Display 210 may be implemented using devices or technology, such as a cathode ray tube (CRT) display, a liquid crystal display (LCD), a plasma display, a light emitting diode (LED) display, a touch screen type display, a projection system, virtual reality or augmented reality glasses or headsets, and/or any other type of display capable of displaying 2D or 3D audiovisual content as known in the art. The disclosed embodiments are not limited to any particular type of display configured in computational device 200.

Computational device 200 may also include one or more communications interfaces 212. Communications interface 212 may allow software and/or data to be transferred between computational device 200, network 140, user systems 110, servers 120, databases 130, and/or other components. Examples of communications interface 212 may include a modem, a network interface (e.g., an Ethernet card or a wireless network card), a communications port, a PCMCIA slot and card, a cellular network card, etc. Communications interface 212 may transfer software and/or data in the form of signals, which may be electronic, electromagnetic, optical, or other signals capable of being transmitted and received by communications interface 212. Communications interface 212 may transmit or receive these signals using wire, cable, fiber optics, radio frequency ("RF") link, and/or other communications channels.

Consistent with the present disclosure, the computer implemented preview system may include at least one processor, which may be configured to execute one or more instructions, algorithms, etc. to perform the functions of the preview system. By way of example, as illustrated in FIGS. 1 and 2, preview system 100 may include one or more processors 202 included in one or more of user systems 110 and servers 120.

In accordance with the present disclosure, the at least one processor of the preview system may be configured to receive a request for a 3D model for preview. The processor may receive the requests in many ways. For example, the request may take the form of a textual or graphic search query. By way of example, user system 110 or server 120 may execute instructions or algorithms to display a web page, a graphical user interface, or other type of display that includes a search box. User 112 may enter a search query in the form of a text string in the search box, using one or more I/O devices 204. For example, the user may use a physical keyboard or a touch screen keyboard to enter the search text. It is also contemplated that the user may use a microphone and voice commands to input the search query into preview system 100.

As one example, the search query may include the word "table" or "lamp," indicating that user 112 desires to search for a 3D model of a table or a lamp, respectively. In some embodiments, user 112 may search for a 3D model using an image instead of entering a text string. For example, the user may provide an image of a table or of a lamp. In response to the user inputs, processor 202 of, for example, server 120 may be configured to access previously stored 3D models from database 130. Further, processor 202 may be configured to select a 3D model from database 130 that matches the search query provided by the user. Thus, for example, processor 202 may select a 3D model of a table in response to the query "table" and a 3D model of a lamp in response to the query "lamp."

Figure 3:
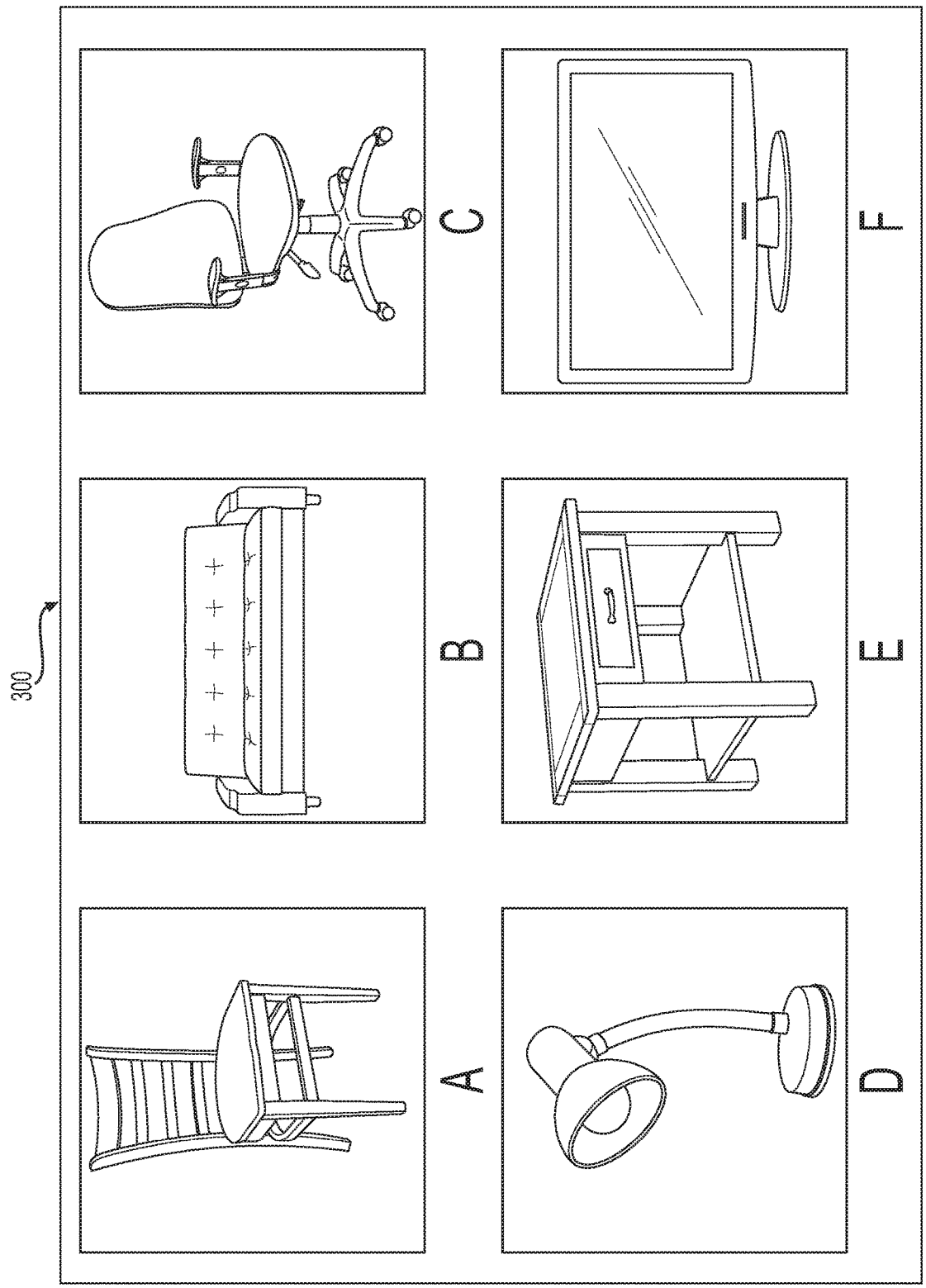
FIG. 3 illustrates an exemplary user interface panel displaying 3D models available for previewing, consistent with disclosed embodiments.

Alternatively, in some embodiments, processor 202 may be configured to retrieve the previously stored 3D models from database 130 and display the retrieved 3D models to the user on a display. The 3D models may be displayed on a web page, or in a graphical user interface in an application associated with preview system 100. By way of example, FIG. 3 illustrates a panel 300 displaying images corresponding to six 3D models, corresponding to a variety of objects, for example, chairs in FIGS. 3A and 3C, a sofa in FIG. 3B, a lamp in FIG. 3D, an end table in FIG. 3E, and a television in FIG. 3F. User 112 may select one or more of the displayed images using one or more I/O devices 204. For example, user 112 may select a displayed image in panel 300 using a mouse, touchscreen gestures, or via voice commands. As discussed above, in response to the selection, processor 202 may access database 130 to retrieve the previously stored 3D models and may select a 3D model that matches the selection made by user 112.

In accordance with the present disclosure the at least one processor may generate at least one representation of the requested 3D model based on a portion of the 3D model content data associated with the requested 3D model. A representation of the 3D model may include a projection or an image of a portion of the model. For example, the representation may include a front view, a top view, a bottom view, a side view, an elevation view, a plan view, etc. It is contemplated that the representation may include a projection of the 3D model on a predefined plane. A representation or projection of the 3D model may include only a portion of the complete 3D model content data associated with the requested 3D model. For example, a representation of the 3D model may include only RGB color values corresponding to an image of the 3D model. In particular, the representation of the 3D model may not include other portions of the complete 3D model content data. For example, the representation of the 3D model may not include geometric locations (x, y, z) or normal vectors for the mesh nodes or points in the point cloud, texture information, material, animation information, or lighting model information.

Figure 4:
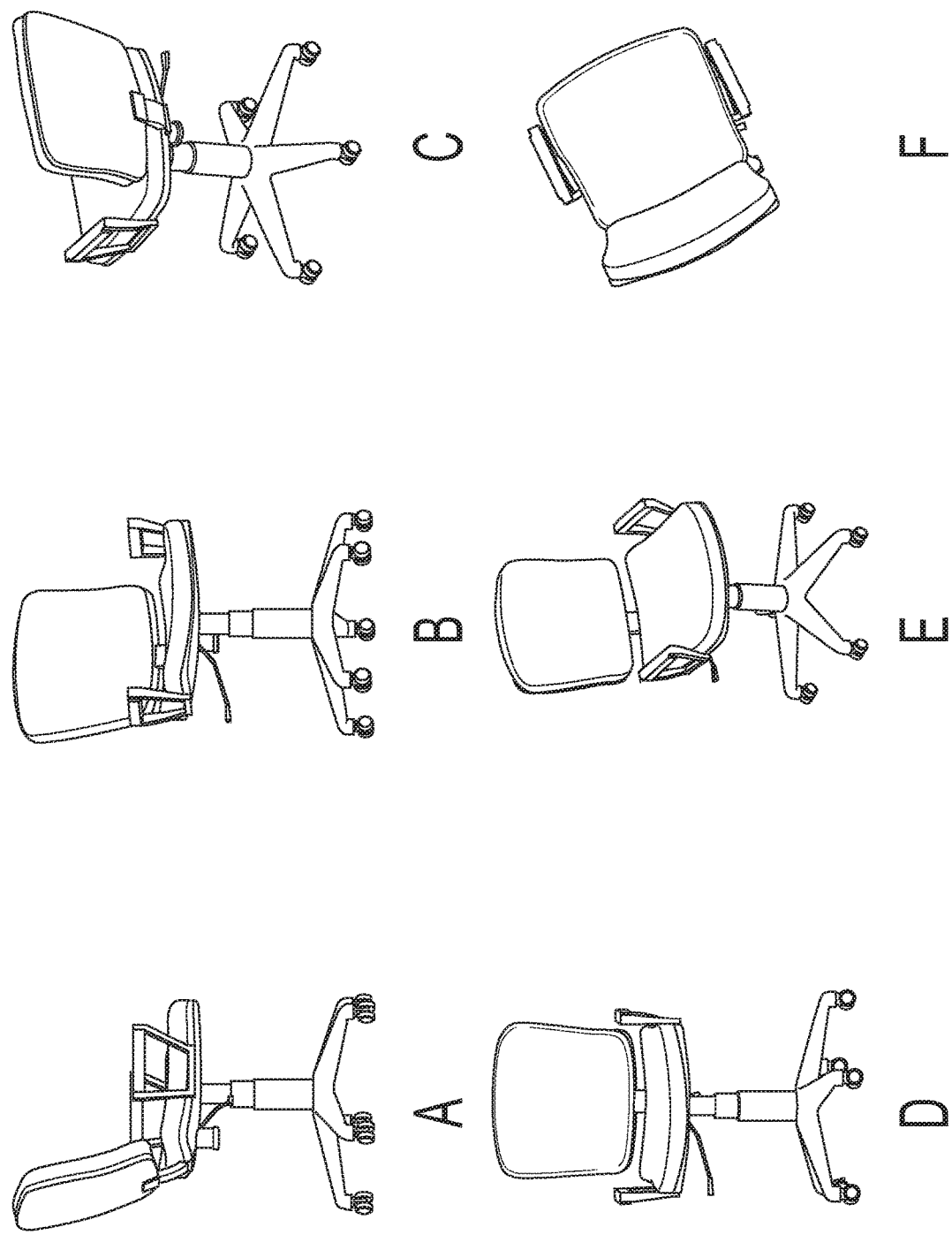
FIG. 4 illustrates exemplary projections of a 3D model, consistent with disclosed embodiments.

FIG. 4 illustrates exemplary projections of a 3D model of a chair, for example, the swiveling chair of FIG. 3C. As illustrated in FIG. 4, six projections of the chair are illustrated in FIGS. 4A-4F. Thus, for example, FIG. 4A illustrates an image showing a side elevation view of the chair. Similarly, for example, FIG. 4F illustrates an image showing a plan view of the chair. Each of the images in FIGS. 4A-4F may include, for example, only RGB color information for that particular view of the chair.

By way of example, one or more projections (or images) a 3D model may be generated by preview generator 122 illustrated in FIG. 1. In one exemplary embodiment, processor 202 of server 120 may execute one or more instructions associated with preview generator 122 to generate the one or more projections of a 3D model requested by the user 112. It is also contemplated that preview generator 122 may be implemented in the form of hardware components, for example, in an application specific integrated circuit (ASIC) programed with instructions to generate the one or more projections of a 3D model. The pre-programmed ASIC microprocessor may be a hardware component associated with server 120.

Consistent with the present disclosure, the at least one representation of the 3D model may include more than one representation. By way of example, the representation of the 3D model of the swiveling chair of FIG. 3C may include the six images shown in FIGS. 4A-4F. Although FIG. 4 illustrates six projections, it is contemplated that any number of projections of the 3D model may be generated by preview system 100. In accordance with the present disclosure, the at least one representation may include a plurality of images of the requested 3D model from differing perspectives. The phrase "differing perspectives" may refer to images of the 3D model, in different orientations of the object in the 3D model, as seen by a camera positioned at a fixed location and having a fixed camera angle relative to the object in the 3D model. Thus, for example, the differing perspectives may represent the different images of the 3D model obtained as the 3D model is rotated about one or more of the various coordinate axes. By way of example, FIGS. 4A-4F represent images of a swiveling chair taken from different perspectives. For example, a comparison of FIGS. 4A and 4B illustrates that FIGS. 4A and 4B represent images of the chair, as seen from a similar camera position, with the chair rotated about an axis generally perpendicular to a surface on which the chair is placed.

Preview generator 122 (shown in FIG. 1) may generate a plurality of images of a 3D model in different orientations. It is contemplated that processor 202 of server 120 may execute instructions associated with preview generator 122 to generate the plurality of images by extracting a portion of the 3D model content data to create each of the plurality images. Processor 202 may store the generated images in database 130. It is also contemplated that in some embodiments, database 130 may store pre-generated images of the 3D model in different orientations, and processor 202 may access these pre-generated images from database 130 when preview of a 3D model is requested according to the disclosed preview system 100. When generating a preview scene, preview viewer 114 may select one or more of the images from different camera perspectives to generate the preview scene. For example, preview viewer 114 may select one or more discrete images showing the object in an orientation as required by the scene in the user's audiovisual environment.

In accordance with the present disclosure the at least one representation of the 3D model may include a plurality of images of the requested 3D model from differing camera distances. For example, elevation views of an object as viewed from different distances of the camera from the object, without changing an orientation of the object, would include images of the object in which the object may have different sizes. In particular, when the camera is positioned nearer to the object in the 3D model, the object will appear larger in an image showing, for example, an elevation view of the object. In a second image corresponding to a camera placed further away from the object in the 3D model, the object will appear smaller in the elevation view.

By way of example, preview generator 122 may generate a plurality of images of a 3D model, for example, of a chair as viewed by a camera placed at different distances from the chair. The plurality of images may include, for example, a first image in which the chair may appear larger than in a second image when the first image corresponds to a camera position placed nearer to the chair than the camera position corresponding to the second image. When generating a preview scene, preview viewer 114 may select one or more of the images from different camera distances to generate the preview scene. For example, preview viewer 114 may select one or more discrete images showing the object based on a position of the camera corresponding to the scene in the user's audiovisual environment.

In accordance with the present disclosure, the at least one representation of the 3D model may include a plurality of discrete images of the 3D model under differing lighting conditions. Lighting conditions may refer to characteristics of the one or more light sources used to illuminate the object in the 3D model. For example, lighting conditions may include positions of one or more light sources relative to the object in the 3D model. For example, the object (e.g., a chair) in the 3D model may be illuminated using light sources placed in one or more of a front side, a backside, a topside, a bottom side, etc., relative to the object. Lighting conditions may also include intensities of the light sources used for illuminating the 3D model. In some exemplary embodiments, lighting conditions may also include variations of light intensity and/or colors over time in a defined manner. It is also contemplated that lighting conditions may include different types of light sources, for example, sunlight compared to artificial sources of light (e.g., incandescent bulbs, sodium lamps, LED bulbs, etc.). In addition, lighting conditions may include distances of the one or more light sources from the object in the 3D model. Lighting conditions may also include information regarding colors of the one or more light sources used to illuminate the object in the 3D model. Further, lighting conditions may include information regarding concentration of light. For example, a laser light source may provide a well-collimated and concentrated beam of light as compared to, for example, a LED bulb.

By way of example, preview generator 122 may generate a plurality of images of the requested 3D model under differing lighting conditions. For example, preview generator 122 may generate a first image of a 3D model of a swiveling chair, corresponding to a light source located above the chair, and a second image of the 3D model of the chair, corresponding to a light source placed on one side of the chair. In another example, preview generator 122 may generate a plurality of images of the requested 3D model of a chair by illuminating the chair with light sources that may be red, blue, green, etc. It is contemplated that processor 202 may execute instructions to generate the plurality of images by adjusting the RGB color values based on the characteristics of the one or more light sources used to illuminate the object in the 3D model. When generating a preview scene, preview viewer 114 may select one or more of the images generated under different lighting conditions to generate the preview scene. For example, preview viewer 114 may select one or more discrete images showing the object illuminated by the light sources present in the scene in the user's audiovisual environment.

Consistent with the present disclosure, the at least one representation of the 3D model may include a plurality of discrete images of the requested 3D model from different camera angles. Camera angle may refer to a position of the camera relative to a horizontal or vertical plane associated with the object depicted in the 3D model. For example, an image of the object in the 3D model may represent a view of the object from a camera located at an eye level of a typical person. In another example, an image of the object in the 3D model may represent a view of the object from a camera located either above or below the eye level of a typical person. As another example, an image of the object in the 3D model may represent a view of the object from a camera placed on one side (e.g., left side, right side, etc.). Thus, a plurality of images of the object depicted in the 3D model may be obtained as viewed from a camera located in different positions relative a horizontal or vertical plane associated with the object depicted in the 3D model, while being located at a same distance from the object. A person of ordinary skill in the art would understand that, in these images, the object would have the same size, but would appear as seen from different positions of the camera relative to the object in the 3D model. When generating a preview scene, preview viewer 114 may select one or more of the images generated under different camera angles to generate the preview scene. For example, preview viewer 114 may select one or more discrete images showing the object from a camera position corresponding to the scene in the user's audiovisual environment.

In accordance with the present disclosure, the at least one processor may be configured to generate the plurality of images based on inputs received from a user. For example, the at least one processor may be configured to receive information regarding a distance between a camera used to view the object and the object. The at least one processor may also be configured to receive information regarding a camera property. Camera property may refer to a location of the camera (e.g., x, y, z coordinates) relative to the object in the 3D model, angle of the camera relative to the object, lighting conditions, field of view of the camera, properties of the lens (e.g., focal length, aperture, etc.), color sensitivity of the camera, etc. The at least one processor may receive the information regarding the distance or the camera property based on user inputs made using one or more I/O devices.

By way of example, user 112 may use one or more of the I/O devices 204 to input a viewing distance between the camera and the object depicted in the 3D model. As another example, user 112 may use one or more of the I/O devices 204 to input one or more of the camera properties discussed above. It is contemplated that user 112 may use I/O devices such as physical or virtual keyboards, a mouse, a touchscreen, and/or a microphone to provide these inputs.

In accordance with the present disclosure, the at least one processor may be configured to generate to the at least one representation of the requested 3D model based on the received at least one of the distance and the camera property. For example, preview generator 122 may generate a first image of the object depicted in the requested 3D model as viewed by a camera placed at a distance, corresponding to the distance input by the user 112. As another example, preview generator may generate an image of the object depicted in the requested 3D model illuminated, using a light of a color specified by the user 112.

According to the present disclosure, the at least one processor may be configured to add noise to one or more of the discrete images of the 3D model requested by the user. Noise may refer to any type of distortion, blurriness, variation in intensity, or random variations made to the RGB color values in the one or more discrete images of the 3D model. Such noise may be included in the one or more discrete images to purposefully distort the images, thereby preventing a user from being able to generate or recreate the complete 3D model content data for the 3D model based on the information provided in the discrete images. Preview generator 122 may add noise to the one or more discrete images in many ways. For example, processor 202 may execute instructions associated with preview generator 122 to change the intensity of one or more pixels in one or more of the discrete images. Additionally or alternatively, processor 202 may execute instructions to alter one or more of the RGB color values corresponding to one or more locations in the discrete images. For example, processor 202 may add a random number to or subtract a random number from the RGB color values at selected pixels in the discrete images. Other mathematical operations to alter the RGB color values are also contemplated.

By way of another example, processor 202 may execute instructions to replace the RGB color values in one or more portions of the discrete images with an average value of adjacent pixels in those portions. It is also contemplated that processor 202 may add noise to a discrete image by executing instructions to include a watermark or a signature associated with the 3D model provider in the image. One of skill in the art would understand that including such a watermark or signature would provide a visual indication that the user does not have access to the complete 3D model content data for the 3D model.

Consistent with the present disclosure, the at least one processor may be configured to include random transformations between at least some of the plurality of discrete images. Transformation refers to spatial translations or rotations of the object. For example, preview generator 122 may adjust a position of the object relative to a camera position or adjust a rotation/orientation of the object relative to the camera before generating an image of the object. For example, when generating a front elevation view of a chair, preview generator 122 may generate the image as viewed from a position disposed at a slight angle (of a few degrees) on one side or the other of the chair instead of an image as viewed directly from in front of the object. As another example, preview generator 122 may distort one or more portions of the discrete image by rotating the image by a random angle. Such random transformations may represent spatial transformations of the discrete image.

Transformations may also refer to time sequence transformations. For example a user may request a preview of a 3D model, including images to show animation of certain portions of the 3D model. Preview generator 122 may generate a series of discrete images representing different positions and/or orientations of the object depicted in the 3D model such that viewing the discrete images in a time sequence would represent animation of the 3D model. In generating these discrete images, however, preview generator 122 may limit the number of images generated such that the animation includes slow or jerky movement of the object.

As another example, preview generator 122 may generate discrete images corresponding to only a portion of the movement of the object depicted in the 3D model. For example, consider the situation where the user wishes to preview a swiveling chair inserted into a scene where the seat of the chair is rotatable over an angle of about 360°. Preview generator 122 may generate a series of discrete images depicting the seat of the chair in different angles of rotation. However, preview generator 122 may only provide discrete images representing positions off the seat of the chair at angles ranging between, for example, 0° and 90°, or 0° and 180°. When a user previews these discrete images, the corresponding animation would only show the chair rotating between the angles of 0° and 90°, or 0° and 180°, and not over the entire rotational range of 0° to 360°. As discussed above, preview generator 122 may incorporate such time transformations to ensure that the user cannot generate or recreate complete 3D model content data of the requested 3D model using the discrete images. For example, a user would not be able to generate an animation of a chair rotating 0° to 360° using discrete images showing chair positions only in the range of 0° to 90°, or 0° to 180° angles.

In accordance with the present disclosure, the at least one representation of the 3D model may include normal information for at least one pixel. As discussed above, the representation of the 3D model generated by the preview generator includes only RGB color information but does not include complete 3D model content data. As also discussed above, complete 3D model content data may include normal information for all mesh nodes or for all points in the point cloud to indicate coverture of the surfaces of the 3D model at each of the points in the point cloud. In some embodiments, the representation of the 3D model generated by preview generator 122 may include normal information for some but not all pixels of the image, in addition to the RGB color information, which is typically included in the projection.

In accordance with the present disclosure the at least one representation of the 3D model may include a predetermined number of projections of the 3D model. As discussed above, a representation of the 3D model corresponds to a projection or an image of an object depicted in the 3D model. It is contemplated that preview generator 122 may generate more than one image of the 3D model in response to a request from user 112. The number of images generated by the preview generator 122 may be predetermined and may or may not be fixed. For example, processor 202 may execute instructions associated with preview generator 122 to generate "n" images of the 3D model in response to a request from user 112, where n may be any positive integer between 1 and infinity.

The predetermined number "n" may be determined by a 3D model provider who owns the 3D model. Alternatively, the predetermined number "n" may be determined by the preview generator 122 based on characteristics of the 3D model. For example, when a 3D model includes many surfaces having distinct curvatures, preview generator 122 may select n to have a higher value (e.g., 10, 15, etc.) for the predetermined number. In contrast, when the 3D model includes relatively flat surfaces the preview generator may decrease the predetermined number "n" to a relatively lower number (e.g. 1 or 2).

In accordance with the present disclosure, the at least one processor may be configured to receive the predetermined number from the user. By way of example, user 112 may use one or more I/O devices 204 to input the predetermined number "n" of images desired by the user. For example, user 112 may use physical or virtual keyboards, or voice commands using a microphone to specify the predetermined number of images desired by the user. Processor 202 may execute instructions associated with preview generator 122 to generate "n" images of the 3D model based on the predetermined number "n" specified by user 112.

Consistent with the present disclosure, the at least one processor may be configured to generate a preview scene by combining the at least one representation with a scene from the user image environment. User image environment may represent an audiovisual environment for which a user (e.g., a content generator) may generate audiovisual content. For example, the user image environment may be a 2-D or 3D gaming environment for which the user may be developing a 2-D or 3D game. The user image environment may also be any of a virtual reality environment, an augmented reality environment, or a mixed reality environment. The user image environment may also represent an application or platform capable of depicting 2D or 3D scenes showing a graphic design or an industrial design. A user may be interested in developing audiovisual content for any of these types of environments.

Figure 5:
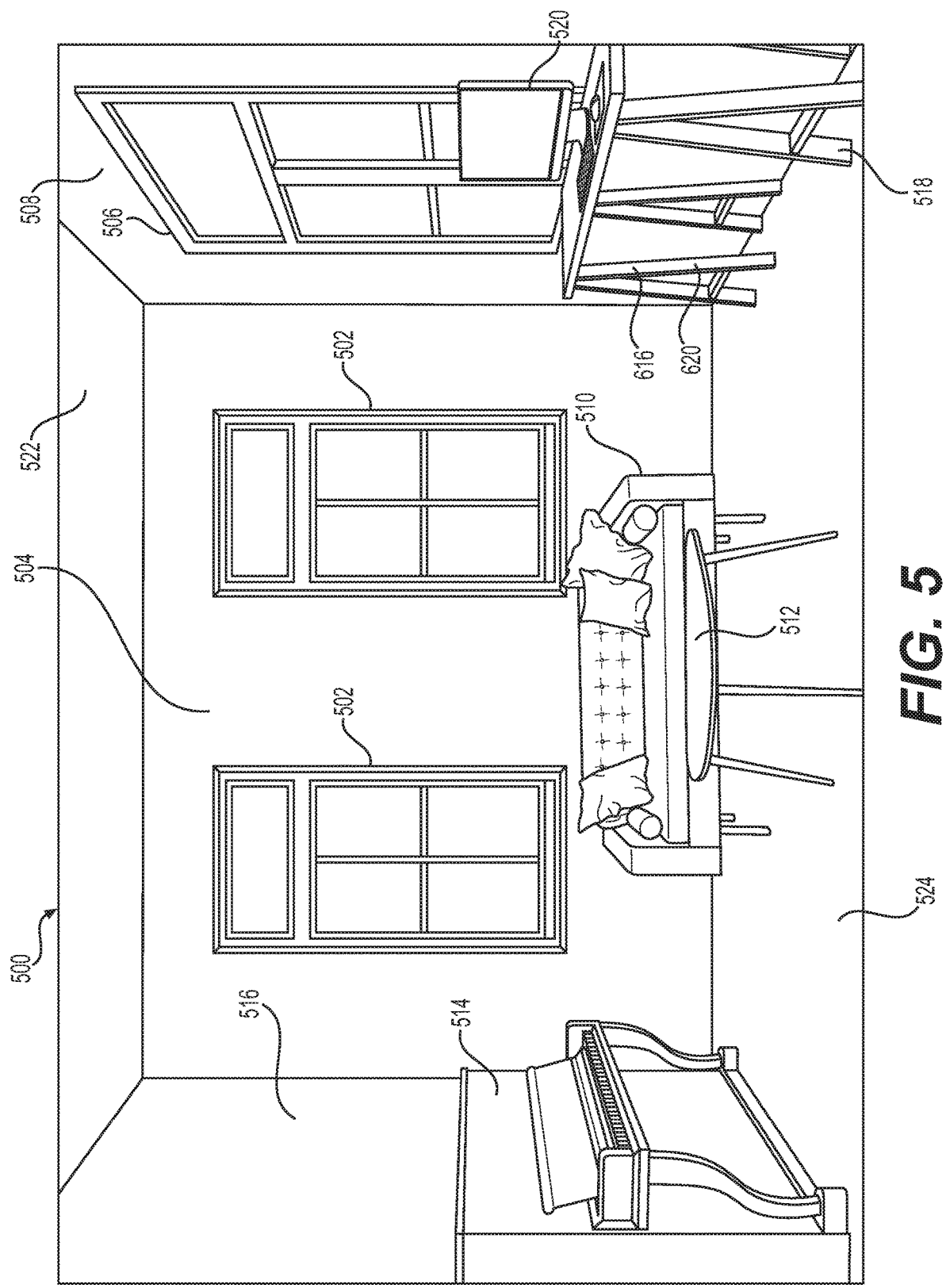
FIG. 5 illustrates an exemplary scene from a user image environment, consistent with disclosed embodiments.

A scene refers to a 2-D or 3D representation of one view of the audiovisual content in the user image of an environment. By way of example, FIG. 5 illustrates a scene depicting a view of room 500. As illustrated in FIG. 5, scene 500 includes two windows 502 on a rear wall 504 and a window 506 on the right wall 508. Scene 500 also depicts sofa 510, coffee table 512, piano 514 positioned near left wall 516, and computer desk 518 and computer 520 positioned adjacent to right wall 508. Scene 500 also includes ceiling 522 and floor 524.

Figure 6:
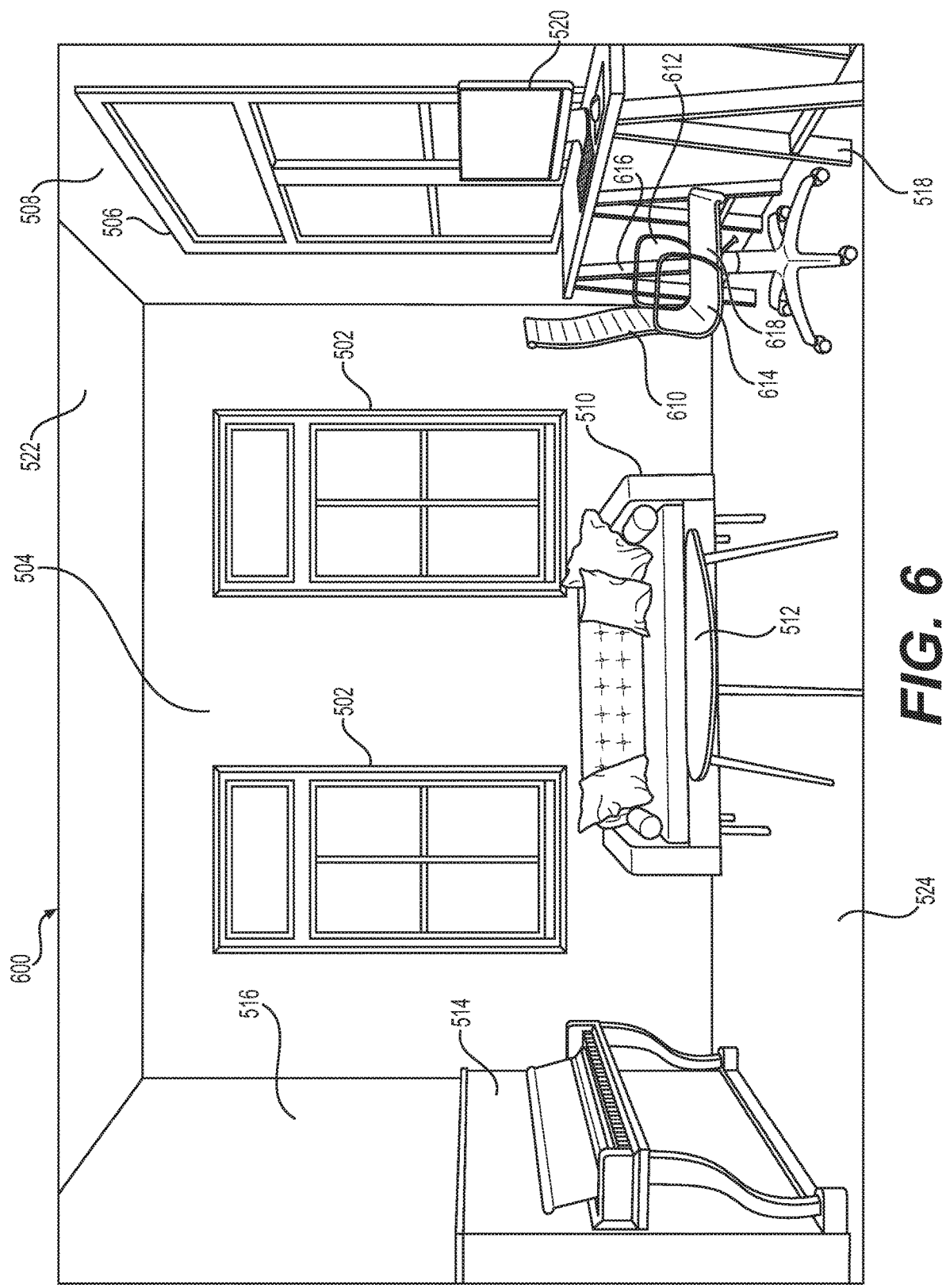
FIG. 6 illustrates an exemplary preview scene, consistent with disclosed embodiments.

By way of example, preview viewer 114 may generate a preview scene by combining at least one representation of a 3D model depicting an object (e.g., a chair) with scene 500. For example, processor 202 may execute instructions associated with preview viewer 114 to generate preview scene 600 illustrated in FIG. 6, by combining a representation of a chair illustrated in FIG. 4A with scene 500 of FIG. 5. As illustrated in FIG. 6, preview scene 600 may include many of the same features as scene 500 of FIG. 5. As illustrated in FIG. 6, preview scene 600 includes windows 502 on a rear wall 504 and a window 506 on the right wall 508. Scene 500 also depicts sofa 510, coffee table 512, piano 514 positioned near left wall 516, and computer desk as 518 and computer 520 positioned adjacent right wall 508, ceiling 522 and floor 524. In addition to these features that were already present in scene 500, however, scene 600 also includes an image (i.e., a representation) of, for example, the chair of FIG. 4A, shown as chair 610. Thus, preview scene 600 includes elements from scene 500 combined with the representation illustrated in, for example, FIG. 4A. Scene 600, generated by processor 202, may be viewable in the user image environment (e.g., a 2D or 3D gaming environment, virtual reality environment, augmented reality environment, or mixed reality environment).

In accordance with the present disclosure, a portion of the at least one representation of the 3D model may be transparent. Thus, when the at least one representation is combined with the scene from the user image environment, the transparent portions in the representation of the 3D model may not occlude (i.e., cover up or block from view) a corresponding portion of the scene. By way of example, processor 202 may execute instructions associated with preview generator 122 to generate a representation of the 3D model that may include transparent portions. For example, as illustrated in FIG. 6, preview generator 122 may generate an image (e.g., FIG. 4A) of the 3D model of the chair of FIG. 3C such that portions of the image between the arm rests and the seat may be transparent. Thus, as illustrated in FIG. 6, when the image of the chair (e.g., FIG. 4A) is combined with scene 500, the transparent portions 612 and 614 do not occlude the portions 616 of computer desk 518 present in scene 500. In contrast, portion 618, representing the seat of the chair, in the image of the chair 610 is not transparent. Thus, portion 620 (see FIG. 5) of computer desk 518 in scene 500 is occluded by portion 618 in scene 600.

In accordance with the present disclosure, the at least one processor may be configured to output the preview scene for display in the user image environment. Consistent with the present disclosure, the preview scene may include incomplete 3D model data corresponding to the object in the 3D model incorporated into the preview scene. By way of example, preview viewer 114 may output the preview scene 600 for viewing on a display capable of displaying preview scene 600 in a user image environment. For example, when the user image environment is a virtual reality environment, preview viewer 114 may output preview scene 600 to virtual reality glasses or to a virtual reality headset. As discussed above, scene 600 may include elements of scene 500 and a representation of chair 610. The representation of chair 610 in scene 600, however, may not include complete 3D model content data corresponding to the 3D model of the chair requested by user 112. In particular, the representation of chair 610 in scene 600 may include, for example, only RGB color information associated with the representation of chair 610, and may exclude, for example, (x,y,z) location data of all points in the point cloud corresponding to the 3D model of the chair, texture information, color information, and or animation information regarding the chair. Because the representation or image of the 3D model (chair 610) included in the preview scene (e.g., scene 600) includes incomplete 3D model content data, the preview scene (e.g., scene 600) also includes incomplete 3D model content data.

In accordance with the present disclosure, the at least one processor may be configured to generate a lighting model for the preview scene based on the normal information corresponding to some but not all pixels included in a representation of the 3D model. As discussed above, normal information indicates curvature of the surface at that particular location. It is contemplated that, in some aspects, preview viewer 114 may use the normal information provided for some pixels by preview generator 122 to adjust the RGB values of the one or more images of the 3D model included in preview scene 600 based on the normal information and the lighting information obtained from the user image environment. It is also contemplated that preview viewer may use the normal information to generate a lighting model, which may indicate how the RGB values should be altered based on the positions and characteristics of the light sources associated with the scene in the user image environment. It is contemplated that the RGB values may be dependent on the lighting conditions, normal information, and characteristics of a surface, for example, a material used to make the surface, a color of the surface, and/or a surface roughness.

By way of example, processor 202 may execute instructions associated with preview viewer 114 to adjust RGB values of the image 610 in scene 600 to depict shading or color variations based on the normal information at some of the pixel in the image 610. Processor 202 may adjust the RGB values based on known lighting conditions in scene 500. For example, processor 202 may adjust the RGB values in image 610 based on the positions, intensities, color, or other lighting characteristics of one or more light sources associated with scene 500 obtained from the user image environment combined with the normal information included in the image of chair 610. In addition, processor 202 may execute instructions to generate a model, in the form of equations or mathematical operations for altering the RGB values based on the positions, intensities, color, or other lighting characteristics of one or more light sources associated with scene 500.

Consistent with the present disclosure, the at least one processor may also be configured to receive a request for complete 3D model content data associated with the requested 3D model. By way of example, user of 114 may use one or more I/O devices 204 to input a request for complete 3D model content data associated with a 3D model. It is contemplated that a web page, an application, or a user interface associated with preview system 100 may include one or more user interface elements that may allow a user to request the complete 3D model content data. For example, the webpage or user interface may include a button or other graphical user interface element that may be activated by the user to request the 3D model content data.

In accordance with the present disclosure the at least one processor may be configured to determine whether the user is authorized to receive the complete 3D model content data. By way of example, processor 202 may determine whether user 112 has provided a monetary payment for purchase of the complete 3D model content data. Processor 202 may make this determination, for example, based on whether an amount of money corresponding to a price of the 3D model has been credited to an account associated with a provider of the 3D model. In some aspects, upon payment of the amount of money, user 112 or user system 110 may receive an authorization code indicating that user 112 is authorized to access complete 3D model content data. Processor 202 may verify the authorization code using information stored, for example, in database 130 to determine whether user 112 is authorized to access the complete 3D model content data.

In accordance with the present disclosure, the at least one processor may be configured to provide to the user the complete 3D model content data associated with the requested 3D model when the user is authorized to receive the 3D model content data. By way of example, server 120 may transmit the complete 3D model content data to user system 110 via network 140 when user 112 is authorized to receive complete 3D model content data. As another example, server 120 may transmit instructions or a link to user system 110, indicating that user 112 or user system 110 may download the complete 3D model content data using the instructions or the link. User 112 may use one or more I/O devices 204 to access the link and download complete 3D model content data from server 120. Other ways of providing the complete 3D model content data are also contemplated. For example, the complete 3D model content data may be provided on to a non-transitory storage medium (e.g. memory stick, compact disc, digital video disc, etc.) and the storage medium may be provided to user 112 via conventional delivery methods.

The disclosed preview system 100 may provide several advantages. In particular, by generating discrete images or representations of a 3D model requested by user 112, the disclosed preview system 100 provides incomplete 3D model content data to user system 110. Thus, user 112 may be prevented from obtaining the complete 3D model content data without adequately compensating the 3D model provider. Similarly, by generating the preview scene on user system 110, the disclosed preview system 100 does not require user 112 to provide any scene information to third parties, for example, to the 3D model provider. Thus, the content rights of user 112 in the user's scene may be protected. Furthermore, by providing only a set of discrete images containing incomplete 3D model data, the disclosed system 100 may improve the processing speed of user system 110 because processor 202 of user system 110 must process less than complete 3D model content data to generate the preview scene. This may allow user 112 to try out many different 3D models in the user environment quickly before selecting a 3D model for actual incorporation in the user environment. Additionally, by providing representations of the 3D model containing incomplete 3D model content data, the disclosed preview system 100 may help minimize the amount of memory 206 or storage space of storage medium 208 in user system 110 required to store the representations. Thus, the disclosed preview system may help improve the computational efficiency of user system 110 by improving processing speed and minimizing the storage requirement, while simultaneously protecting the content usage rights of both the 3D model providers and users 112.

Figure 7:
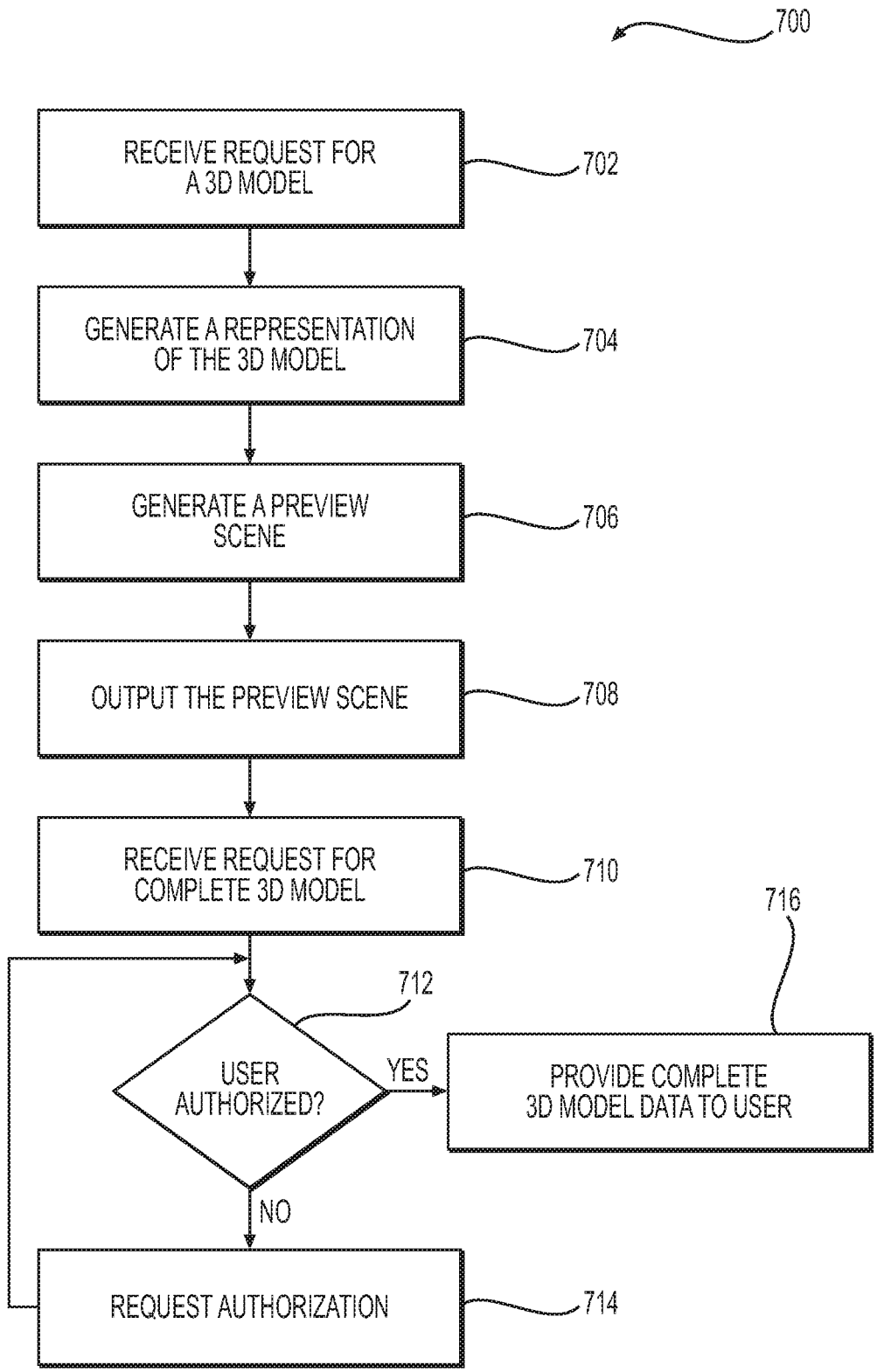
FIG. 7 illustrates an exemplary method for previewing 3D content without providing complete 3D model content data consistent with disclosed embodiments.

FIG. 7 illustrates an exemplary method 700 of previewing 3D content without providing complete 3D model content data. The order and arrangement of steps in method 700 is provided for purposes of illustration. As will be appreciated from this disclosure, modifications may be made to method 700 by, for example, adding, combining, removing, and/or rearranging the steps of method 700. Certain steps of method 700 are described as being performed by the preview generator 122 or preview viewer 112 of preview system 100. It is contemplated that processor 202 associated with user system 110 or server 120 may execute instructions associated with preview generator 122 or preview view of 112 to perform these steps.

Method 700 may include a step of receiving a request for a 3D model (step 702). As discussed above, user 112 may request a 3D model either by providing a text-based search query, by providing an image, or by selecting the 3D model from the menu of 3D models provided to user 112 on a webpage or on a graphical user interface associated with preview system 100. By way of example, in response to the user's request, processor 202 of server 120 may access a library of 3D models stored in database 130. Processor 202 of server 120 may select from the library of 3D models a 3D model corresponding to the search query or image provided by user 112, or corresponding to the 3D model selected by user 112 from a menu of 3D models.

Method 700 may include a step of generating a representation of the 3D model (step 704). As discussed above, preview generator 122 may generate one or more representations or projections (e.g. images) of the 3D model requested by user 112. As also discussed above, each of the images of the 3D model generated by preview generator 122 may include only a portion of the complete 3D model content data. In particular, each image of the 3D model may include only RGB color values corresponding to pixels in the image and may exclude, for example, (x,y,z) location data of all points in the point cloud corresponding to the 3D model of the chair, texture information, color information, and or animation information associated with the 3D model.

In step 704, preview generator 122 may generate only one projection of the 3D model or may generate more than one projection of the 3D model. When preview generator 122 generates more than one projection of the 3D model the images of the 3D model may be obtained from differing perspectives, from differing camera distances, under different lighting conditions, or from different camera angles. In step 704, preview generator 122 may also add noise or other random transformations to one or more of the images to purposefully distort the images, preventing user 112 from recreating the complete 3D model content data of the requested 3D model. It is contemplated that in some aspects processor 202 may receive a camera distance, camera property, and/or a number of desired projections from the user. Preview generator 122 may be configured to generate the one or more images (i.e. representations) of the 3D model, in step 704, based on the received camera distance, camera property, and/or number of desired projections.

Method 700 may include a step of generating a preview scene (step 706). Preview generator 112 may generate a preview scene by combining information regarding a scene from a user image environment (e.g., scene 500 of FIG. 5) and image information associated with one or more images of the 3D model generated by preview generator 122, for example, in step 704. By way of example, processor 202 of user system 110 may execute instructions associated with preview viewer 112 to generate a preview scene by combining information regarding a scene from a user image environment (e.g., scene 500 of FIG. 5) and image information associated with one or more images of the 3D model generated in, for example, step 704. FIG. 5 illustrates an exemplary scene 500 from a user image environment, for example, from a virtual reality gaming environment. As illustrated in FIG. 5, scene 500 depicts a view of a room including various components such as windows 502, rear wall 504, window 506, right wall 508, sofa 510, coffee table 512, piano 514, left wall 516, computer desk 518, computer 520, ceiling 522, and floor 524. FIG. 6 illustrates an exemplary scene 600, which may be generated by preview viewer 114, by combining a representation of a chair (e.g., as depicted in FIG. 4A) with scene 500.

Method 700 may include a step of outputting the preview scene (step 708). As discussed above preview viewer 114 may output preview scene, for example scene 600 illustrated in FIG. 6, for viewing in the user image environment. By way of example, processor 202 of user system 110 may execute instructions associated with preview viewer 114 to output preview scene 600 to virtual reality glasses, virtual reality headset, and/or to any other type of display suitable for displaying preview scene 600 in the user image environment.

Method 700 may include a step of receiving a request for complete 3D model content data (step 710). By way of example, user 112 may request complete 3D model content data using one or more I/O devices 204. Method 700 may also include a step of determining whether user 112 is authorized to receive the complete 3D model content data (step 712). By way of example, processor 202 of server 120 may determine whether user 112 is authorized to receive the complete 3D model content data. Processor 202 may execute instructions or algorithms known in the art to determine whether user 112 has provided monetary payment associated with the requested 3D model. Processor 202 may determine that user 112 is authorized to receive the complete 3D model content data when user of 114 has provided the monetary payment. In contrast processor 202 may determine that user 112 is not authorized to receive the complete 3D model content data, for example, when user 112 has not provided monetary payment.

When user 112 has been determined to be authorized to receive complete 3D model content data (step 712: Yes), method 700 may proceed to step 716 of providing complete 3D model content data to user 112. As discussed above, processor 202 and communications interface 212 of server 120 may cooperate to transmit the complete 3D model content data to user 112 or user system 110 via network 140. Additionally or alternatively, server 120 may provide instructions or a link to user 112 or user system 110 to allow user system 110 to download the complete 3D model content data from server 120 via network 140.

When user 112 has been determined not to be authorized to receive the 3D model content data (step 712: No), method 700 may proceed to step 714 of requesting authorization. In step 714, processor 202 of server 120 may display a web page, an application, or a graphical user interface on, for example, display 210 of user system 110, to provide user 112 or user system 110 with instructions for providing the necessary monetary payment or other indicia of authorization to receive the complete 3D model content data. Method 700 may then return to step 712 to verify whether user 112 has been authorized to receive complete 3D content data.

Various alterations and modifications may be made to the disclosed exemplary embodiments without departing from the spirit or scope of the disclosure as embodied in the following claims. It is intended that the specification and examples be considered as exemplary only, with a true scope and spirit of the disclosed embodiments being indicated by the following claims.

What is claimed is:

1. A computer-implemented preview system for previewing 3D content without providing complete 3D model content data, the preview system comprising:
at least one processor configured to:
receive a request for a 3D model for preview;
generate at least one representation of the requested 3D model based on a portion of the 3D model content data associated with the requested 3D model;
generate a preview scene by combining the at least one representation with a scene from a user image environment; and
output the preview scene for display in the user image environment, the preview scene containing incomplete 3D model content data.

2. The computer-implemented preview system of claim 1, wherein the user image environment is one of a virtual reality environment, an augmented reality environment, a mixed reality environment, or a game development environment.

3. The computer-implemented preview system of claim 1, wherein the at least one representation includes a plurality of discrete images of the requested 3D model from differing perspectives.

4. The computer-implemented preview system of claim 1, wherein the at least one representation includes a plurality of discrete images of the requested 3D model from differing camera distances.

5. The computer-implemented preview system of claim 1, wherein the at least one representation includes a plurality of discrete images of the requested 3D model under differing lighting conditions.

6. The computer-implemented preview system of claim 1, wherein the at least one representation includes a plurality of discrete images of the requested 3D model, each discrete image being from a different camera angle.

7. The computer-implemented preview system of claim 1, wherein the at least one representation includes a plurality of discrete images of the requested 3D model, and the at least one processor is further configured to:
add noise to at least one of the discrete images to purposefully distort the at least one of the discrete images; or
include random transformations between at least some of the plurality of discrete images.

8. The computer-implemented preview system of claim 1, wherein a portion of the at least one representation of the 3D model is transparent so that the transparent portion does not occlude any portion of the scene from the user image environment in the generate preview scene.

9. The computer-implemented preview system of claim 1, wherein, in the preview scene, the at least one representation of the 3D model occludes at least a portion of the scene from the user image environment.

10. The computer-implemented preview system of claim 1, wherein the at least one representation of the 3D model includes normal information for at least one pixel.

11. The computer-implemented preview system of claim 10, wherein the at least one processor is further configured to generate a lighting model for the preview scene based on the normal information.

12. The computer-implemented preview system of claim 1, wherein the at least one representation of the 3D model includes a predetermined number of discrete images of the 3D model.

13. The computer-implemented preview system of claim 12, wherein the at least one processor is further configured to receive the predetermined number from a user.

14. The computer-implemented preview system of claim 1, wherein the at least one processor is further configured to:
receive, from a user, at least one of a distance and a camera property; and
generate the at least one representation of the requested 3D model based on the received at least one of the distance and the camera property.

15. The computer-implemented preview system of claim 1, wherein the at least one processor is further configured to:
receive, from a user, a request for the complete 3D model content data corresponding to the requested 3D model;
determine whether the user is authorized to receive the complete 3D model content data; and
provide the complete 3D model content data associated with the requested 3D model when the user is authorized to receive the complete 3D model content data.

16. A computer-implemented method of previewing 3D content without providing complete 3D model content data, the method comprising:
receiving a request for previewing a 3D model;
generating, using at least one processor, at least one representation of the requested 3D model based on a portion of the 3D model content data associated with the 3D model;
generating, using the at least one processor, a preview scene by combining the at least one representation with a scene from a user image environment;
outputting, using the at least one processor, the preview scene for display in the user image environment, the preview scene containing incomplete 3D model content data;
receiving a request for the complete 3D model content data corresponding to the 3D model;
determining whether a user is authorized to receive the complete 3D model content data; and
providing the complete 3D model content data associated with the 3D model when the user is authorized to receive the complete 3D model content data.

17. The method of claim 16, wherein the at least one representation includes a plurality of discrete images of the requested 3D model, and the method further includes at least one of
adding, using at least one processor, noise to at least one of the discrete images to purposefully distort the at least one of the discrete images, and
including, using at least one processor, random transformations between at least some of the plurality of discrete images.

18. The method of claim 17, wherein the noise includes at least one of a watermark or a signature.

19. The method of claim 16, further including:
receiving at least one of a distance and a camera property; and
generating the at least one representation of the requested 3D model based on the received at least one of the distance and the camera property.

20. A non-transitory computer-readable medium storing instructions for previewing 3D content without providing complete 3D model content data, which when executed by at least one processor, cause a computer to perform the steps of:
receiving identification of a 3D model for preview;

generating at least one representation of the requested 3D model based on a portion of the 3D model content data associated with the 3D model;

generating a preview scene by combining the at least one representation with a scene from a user image environment; and outputting the preview scene for display in the user image environment, the preview scene containing incomplete 3D model content data;

receiving a request for the complete 3D model content data corresponding to the 3D model;

determining whether a user is authorized to receive the complete 3D model content data; and providing the complete 3D model content data associated with the requested 3D model when the user is authorized to receive the complete 3D model content data.

\* \* \* \* \*